United States Patent [19]
Schubart et al.

[11] Patent Number: 5,520,121
[45] Date of Patent: May 28, 1996

[54] PLASTIC PALLET

[75] Inventors: Gunter Schubart, Waldbrunn; Dietmar Przytulla, Kerpen, both of Germany

[73] Assignee: Mauser-Werke GmbH, Brühl, Germany

[21] Appl. No.: 392,392

[22] Filed: Feb. 22, 1995

Related U.S. Application Data

[62] Division of Ser. No. 133,039, filed as PCT/EP92/01053, May 13, 1992, published as WO92/20585, Nov. 26, 1992, abandoned.

[30] Foreign Application Priority Data

| May 16, 1991 | [DE] | Germany | 91 06 055 U |
| Jul. 12, 1991 | [DE] | Germany | 91 08 561 U |
| Aug. 21, 1991 | [DE] | Germany | 91 10 315 U |

[51] Int. Cl.$^6$ ................................................ B65D 19/32
[52] U.S. Cl. ........................ 108/57.1; 108/55.1; 108/55.3
[58] Field of Search .................... 108/57.1, 51.1, 108/51.3, 53.3, 55.1

[56] References Cited

U.S. PATENT DOCUMENTS

| 3,477,631 | 11/1969 | Dunlap, Jr. et al. | 108/55.3 |
| 3,580,190 | 6/1971 | Fowler | 108/51.1 |
| 3,603,272 | 9/1971 | Ditges | 108/51.1 |
| 3,603,273 | 9/1971 | Riffe | 108/51.1 |
| 3,630,157 | 12/1971 | Ortenblad | 108/53.3 |
| 3,759,194 | 9/1973 | Fujii et al. | 108/51.1 |
| 3,915,098 | 10/1975 | Nania | 108/51.1 |
| 3,938,448 | 2/1976 | Nishitani et al. | 108/51.1 |
| 3,964,400 | 6/1976 | Brand | 108/51.1 |
| 4,013,020 | 3/1977 | Schoeller | 108/51.1 |
| 4,480,748 | 11/1984 | Wind | 108/53.3 X |
| 4,597,338 | 7/1986 | Kreeger | 108/51.1 |
| 4,742,781 | 5/1988 | Shuert | 108/53.3 |
| 4,843,976 | 7/1989 | Pigott et al. | 108/56.1 |
| 4,982,859 | 1/1991 | Colebrook | 108/51.1 |
| 5,029,734 | 7/1991 | Nichols | 108/55.3 X |
| 5,170,721 | 12/1992 | Troth et al. | 108/51.1 |
| 5,226,373 | 7/1993 | Esch | 108/51.1 |

FOREIGN PATENT DOCUMENTS

| 2264595 | 5/1974 | Germany | 108/55.3 |

Primary Examiner—Peter M. Cuomo
Assistant Examiner—Robert J. Sandy
Attorney, Agent, or Firm—Henry M. Feiereisen

[57] ABSTRACT

The invention relates to a plastic pallet (10, 32) in a stable and torsionally rigid box-like construction for storing and transporting goods. The upper plate (12) is provided on its underside with ribs (14). Closed side walls (24), each having two recesses (26) for engagement by the carrying forks of a fork lifter, and the spacers (16) to which a thin base plate (20) is welded are formed in a single piece with the upper plate (12). In the base pallet (32) for a pallet container are formed a collecting trough (40) in the center of the upper surface (34) and a supporting ledge (32) extending at the outside around the circumferential area.

16 Claims, 9 Drawing Sheets

PLASTIC PALLET

This is a division of application Ser. No. 08/133,039, now abandoned, filed Oct. 13, 1993 which is derived from International patent application PCT/EP92/01053, filed May 13, 1992.

The invention refers to a plastic pallet for transporting and storing goods, including a planar, continuously closed upper deck provided with ribs on its underside, spacers which are aligned at right angles to the upper deck and arranged in the center, in the corner regions, and in the middle of every outer edge of the pallet, and a base part which is securely connected to the upper deck via the spacers, wherein openings are formed between the upper deck and base part and between the spacers for allowing engagement by the forks of a fork lifter to thereby allow transportation of the pallet.

Pallets manufactured from plastic material are known in a great variety of forms. These pallets are generally provided with numerous openings and reliefs and with a distinct ribbing to economize on plastic material.

A plastic pallet of the above-stated type is already known e.g. from EP-A-0 400 640. This known pallet has a planar, continuously closed upper plate which is provided on its underside with numerous spacers. Three runners serving as a base part are placed upon the spacers in longitudinal direction of the pallet at the edges and in the center respectively. An essential aspect is directed to the configuration of the plug-in connections of this plastic pallet which is made of several parts. This pallet has good resistance to bending in the longitudinal direction of the runners, but not in the transverse direction.

It is an object of the present invention to eliminate these drawbacks and to provide a plastic pallet which is torsionally stiff and has a high loading capacity with respect to static and dynamic loads.

In accordance with the invention, this object is met by providing the base part of the pallet as a planar, continuously thin base deck with openings/reliefs being arranged inside the base deck. The provision of a continuous base deck allows the production of a pallet in a closed box-like construction with great torsional rigidity and resistance to bending in the longitudinal and transverse directions. In order to complete the box-like construction, the pallet suitably has an outer, essentially closed, continuous side wall between the upper deck and the lower deck. Only two separate recesses are provided at a distance from one another in the side walls for allowing engagement by the forks of a fork lifter or a lifting truck so that the pallet can be used as a conventional four-way pallet.

In accordance with a feature of the invention, the base deck is made of two identical parts, and these parts as well as the upper deck are made in one piece with the molded ribs, the molded spacers, and the molded side walls by way of the cost-effective compression molding process. Since the base deck is made of two identical parts, only a small compression mold is required.

Suitably, both parts of the base deck are rigidly welded with the upper deck along the spacers or side walls. This welding is preferably carried out by the butt-welding process which is known per se.

In order to prevent damage to the sharp corners of the pallet which are at greatest risk during use, the corners are suitably slanted slightly at an angle of approximately 45° or have a corresponding bevel in the vertical plane.

In accordance with a particular design as a chemicals pallet with dimensions of 1000×1200×145 mm, the pallet has a loading capacity of more than 2,500 kg for dynamic loads and 15,000 kg for static loads. A particular advantage of the plastic pallet according to the invention resides in the very thin design of the base plate, e.g. only approximately 8 mm thick, with the recesses in the side walls, and thus also the edge of the base deck being flattened or bevelled at the edges for improved engagement by the forks of a fork lifter or the running rails (carrying arms) of a lifting truck. The depth for engagement of these recesses in the side walls is roughly 90 mm so that the chemicals pallet is particularly suitable for the use with lifting trucks. The openings or reliefs arranged in the base deck are provided exclusively at slightly lifted pallets to allow passage of the rollers of a lifting truck.

For the storage of piece goods or small containers, e.g. in high-shelf storehouses or to transport standardized containers, e.g. by truck, the pallet is constructed as a so-called Euro-pallet or pool-pallet with a length of 1200 mm and a width of only 800 mm. In a further slightly modified form, the pallet is constructed as a base frame for a pallet container and is provided with a groove formed in the surface of the upper deck so as to extend around the outer circumferential area for receiving the lower edge of the outer supporting shell of the pallet container. In this manner, the supporting shell is advantageously secured along a continuous circumferential area in the radial direction so as to prevent an outward bulging of the inner container and supporting shell in the filled state. Further, a circumferentially extending supporting strip or shoulder which projects out of the upper surface of the pallet and has a virtually triangular cross section is advantageously provided for supporting the inner container which is made of thin-walled plastic material. The side of the supporting strip facing the plastic inner container is rounded or shaped in a convex manner corresponding to the curvature of the inner container.

In a similar embodiment of the plastic pallet as a base frame or base deck for a pallet container with placed upon inner thin-walled plastic container and an outer reinforcing shell, e.g. of wire grating bars, which tightly encloses the plastic container, the pallet has a substantially planar and closed (uninterrupted) surface which is provided in vicinity of its outer edge or in its circumferential area with a raised supporting shoulder which extends at least partially along the circumference for contact and support of the inserted plastic container and for contact and support of the supporting shell of the pallet container which bears thereupon from outside. This embodiment advantageously increases the resistance to fracture when falling even from great heights and prevents a lateral displacement of the filled plastic container relative to the base pallet at the moment of impact on the ground.

To additionally secure the outer supporting shell in the radial direction, this embodiment can be additionally provided externally in front of the raised supporting shoulder with the groove described in claim 8 which is formed around the circumferential area for receiving the lower edge of the outer supporting shell.

In the following, the invention is explained in more detail and described with reference to the exemplified embodiments shown in the drawings.

Figure 1:
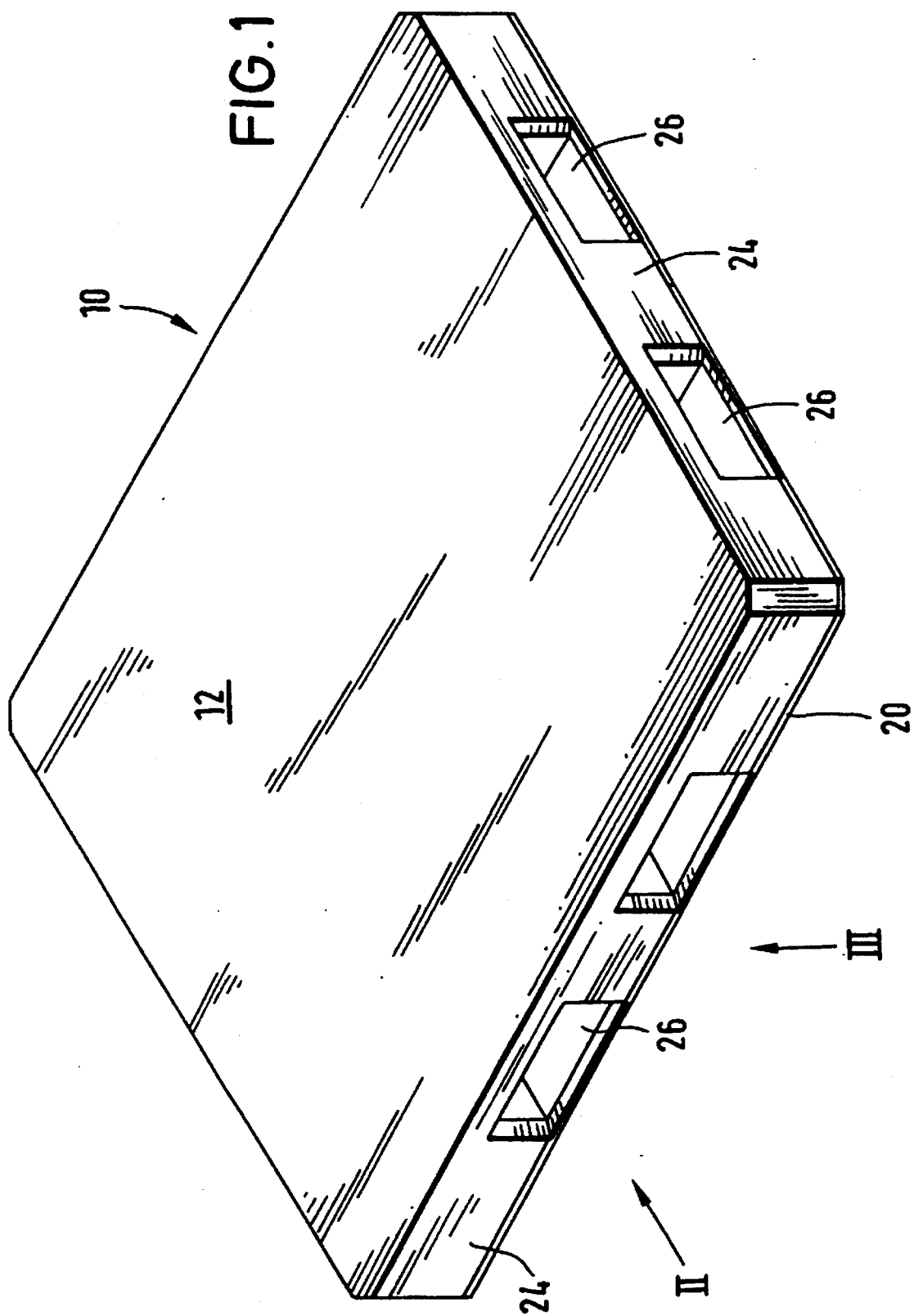
FIG. 1 is a perspective view of a plastic pallet according to the invention as seen from above.

In FIG. 1, a rectangular plastic pallet having a completely closed, uninterrupted, smooth and planar upper deck 12 is designated by reference numeral 10. To ensure good protection against slipping, the surface of the upper deck 12 can be roughened, i.e. provided for example with ripples or grain.

The corners of the pallet 10 are slightly slanted (by approximately 20–30 mm).

Figure 2:
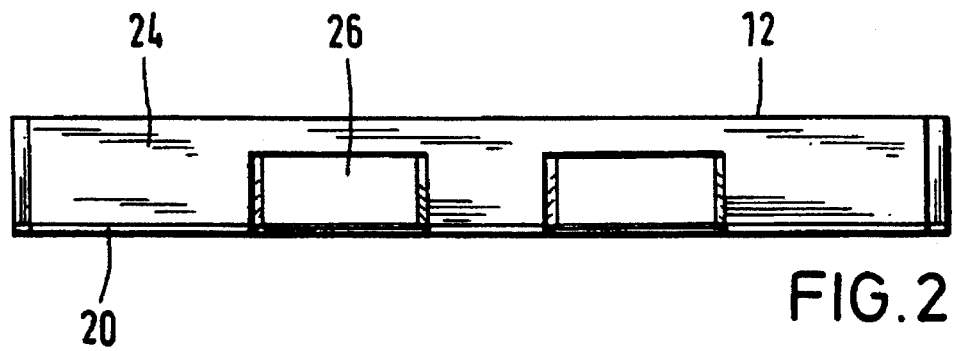
FIG. 2 is a side view of the plastic pallet according to FIG. 1.

The outer side walls 24 extending vertically relative to the upper deck 12 and base plate 20 are likewise continuously smooth and planar, as can be seen from FIG. 2, with each side wall 24 having two separate and spaced recesses 26 for engagement by the forks of a fork lifter or the carrying arms of a lifting truck.

The four-way pallet or double-deck pallet which is constructed in a torsionally rigid box-type manner as a Euro-pallet or pool pallet preferably has approximate dimensions of 800×1200×145 mm. For use as a chemicals pallet its length/width dimensions are roughly 1000×1200×145 mm.

Figure 3:
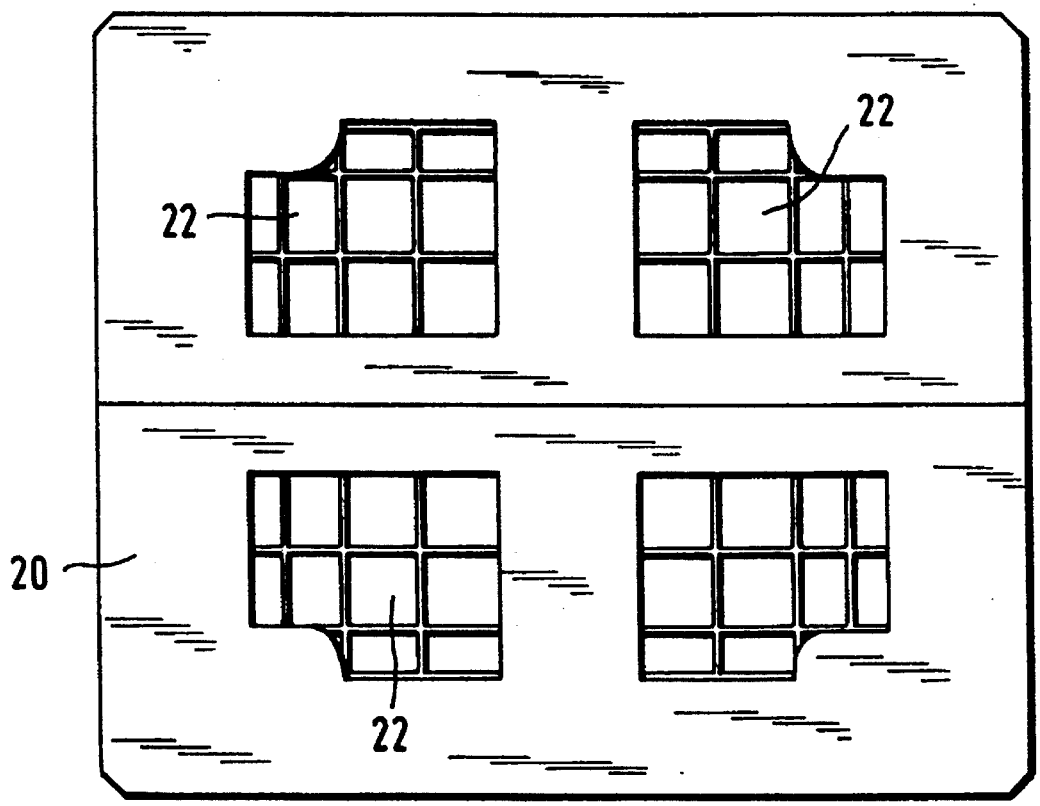
FIG. 3 is a top view of the lower base or base deck of the plastic pallet according to FIG. 1.

As best seen in FIG. 3, the base part is also designed as a planar, continuous thin base deck 20 and four substantially rectangular openings or reliefs 22 are provided only on the inside of the base deck 20 to permit passage of the rollers of a lifting truck because the plastic pallet according to the invention should be suitable in particular for use with lifting trucks in warehouses or high-shelf storehouses. Therefore, the base deck 20 is also comparatively thin (approximately only 8 mm thick) with a sharply beveled entrance edge.

Figure 4:
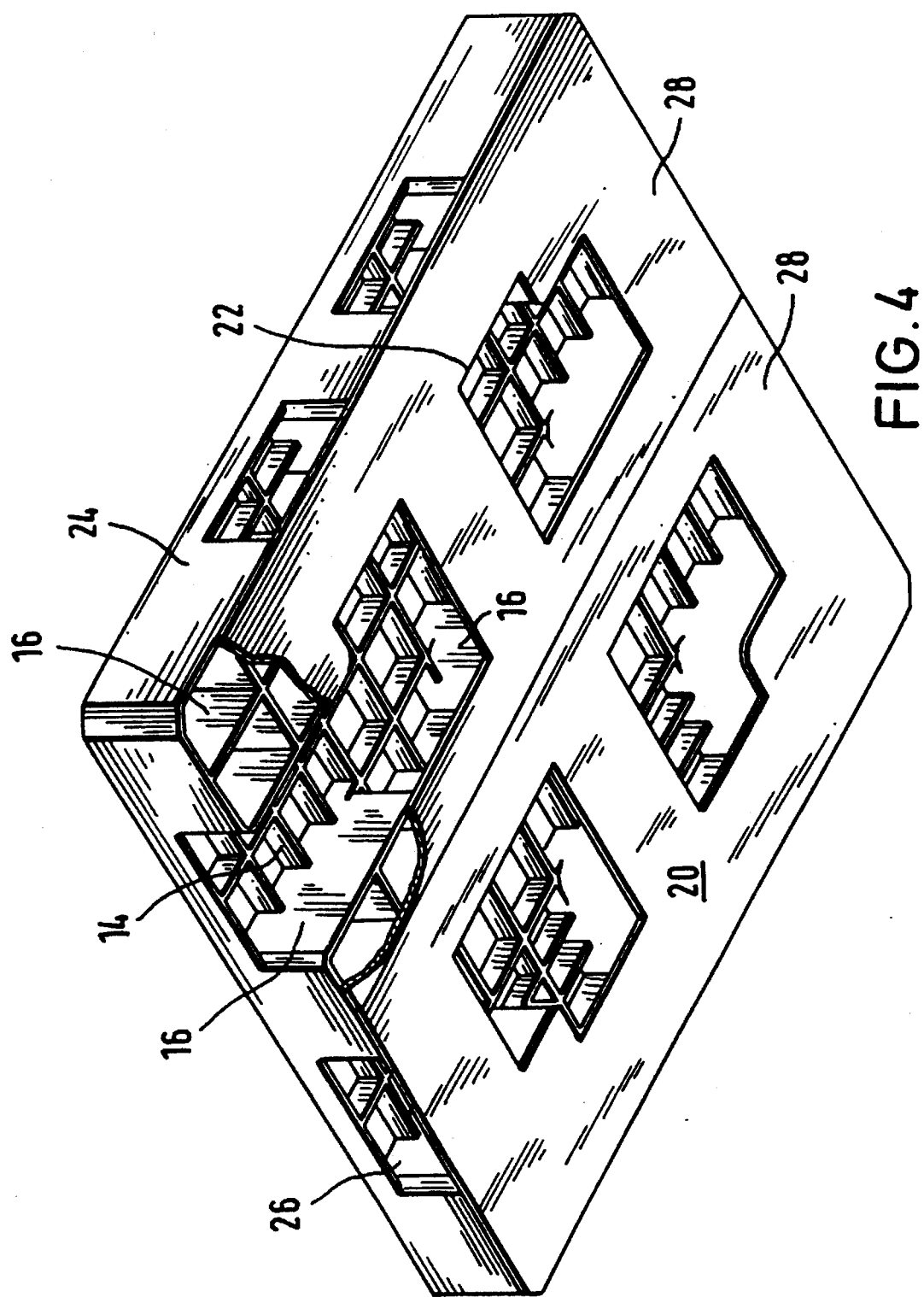
FIG. 4 is a perspective view of the underside of the pallet according to FIG. 1, with the base deck being partially broken away (cut) in the front area.

The perspective (isometric) view of the plastic pallet 10 in FIG. 4 shows the ribs 14 aligned at right angles on the underside of the upper deck 12 (upper base). It can also be seen that the flat base deck 20 is produced from two identical parts 28 which bear upon each other so as to be flush (closed) along a central partition seam. A plurality of spacers 16 projecting out of the ribs 14 on the underside of the upper deck 12 are arranged in the center of the pallet, in its corner regions, and in the center of each outer edge (side wall) of the pallet. However, the ribs between the spacers could also be constructed so as to slope at an angle of 45°.

According to the invention, the upper deck 12 is made in a single piece by way of compression molding in one working step with the ribbing 14, the spacers 16, and all side walls 24, as are both parts 28 of the base deck 20. The three parts of the pallet are then, preferably by way of butt-welding process, securely and nondetachably welded together. In this manner, the torsionally rigid and bending-resistant box shape of the plastic pallet according to the invention is realized with an extremely thin stringer.

Figure 5:
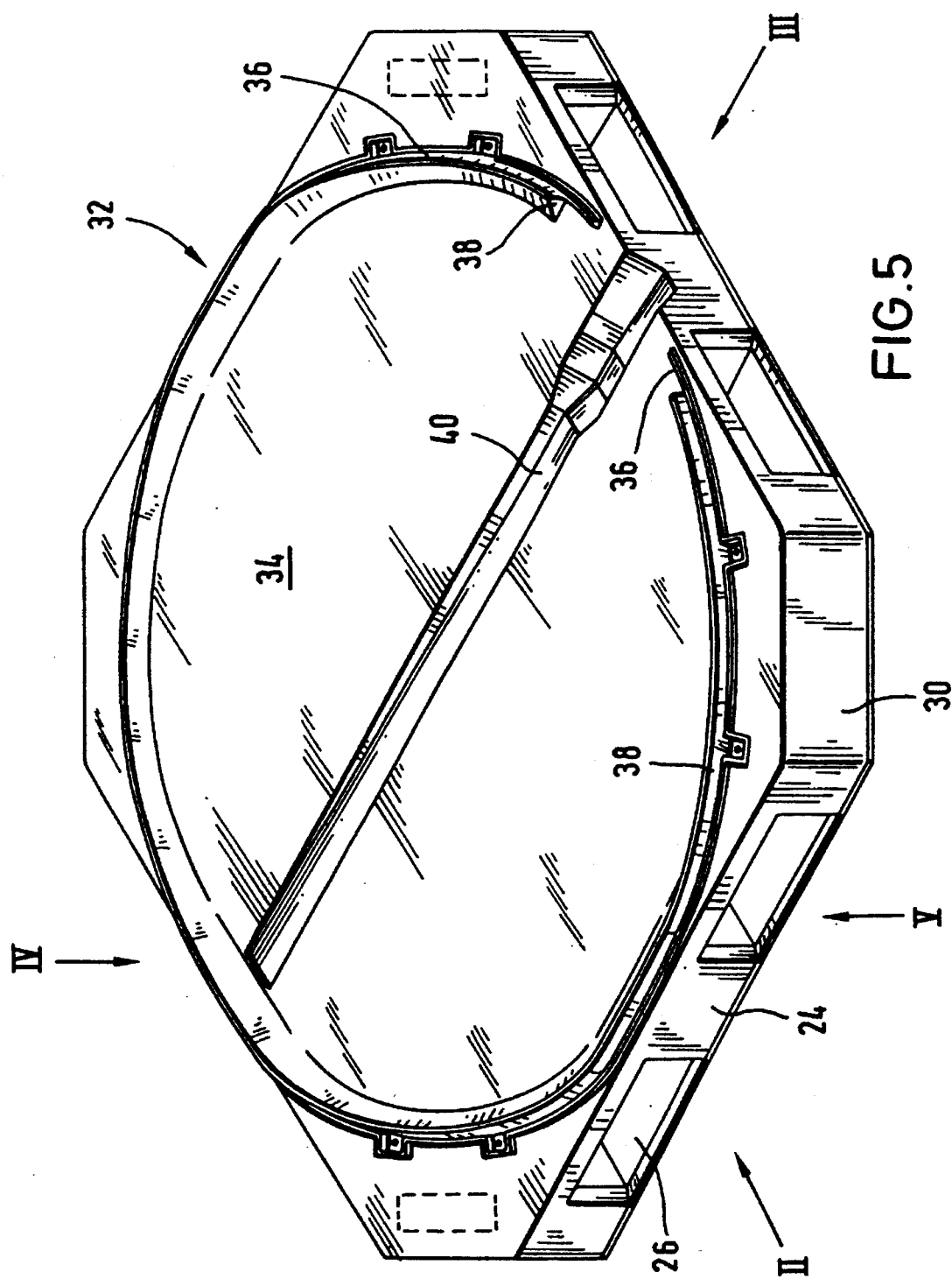
FIG. 5 is a perspective view of a further exemplified embodiment of the plastic pallet, according to the invention, for a pallet container.

Another embodiment of the plastic pallet according to the invention is shown in FIG. 5. This particular plastic pallet 32 is constructed as a base frame for a pallet container and is provided with an inner thin-walled plastic container (volumetric capacity of approximately 1000 l) and a supporting shell (e.g. of sheet metal, steel-wire grating or a cardboard shell of rolled and glued kraft paper) which rigidly encloses the plastic container. A groove 36 (e.g. 8 mm wide) which extends around the circumferential area is formed or pressed into the planar surface 34 of the pallet 32 for receiving the lower edge of the supporting shell of the pallet container. This groove 36 provides a secure seat for the supporting shell of the pallet container and a secure fastening to protect against radial forces, e.g. forces causing an outward bulging at the straight side edges and tensile forces directed inward in the corner areas.

Further, a circumferentially extending strip 38 which has an approximate triangular cross section and projects out of the surface 34 of the pallet 32 is provided on the inside of the groove 36 for advantageously supporting the lower edge of the inner plastic container. Small rectangular molded-in portions with bores for threaded screws are preferably provided in the corner areas of the pallet. Holding clamps are inserted in these molded-in portions and the supporting shell can accordingly be fastened or screwed onto the pallet 32 so as to be secured against the influence of axial tensile forces. A collecting trough 40 which extends in a straight line with increasing depth toward the front outer edge of the pallet is provided in the center of the pallet 32. A run-off groove formed in a corresponding manner in the lower base of the thin-walled plastic container arranged thereon adjoins this trough 40 and leads to the lateral outlet valve of the plastic container on the base side so as to ensure a complete emptying of the container. The upper deck of the pallet 32 can suitably be provided with stamped inserts in the same location in one or more corner areas at the bevel 30 for placement of customer-specific data, such as date of manufacture, company logo, license number, customer logo, etc.

Figure 6:
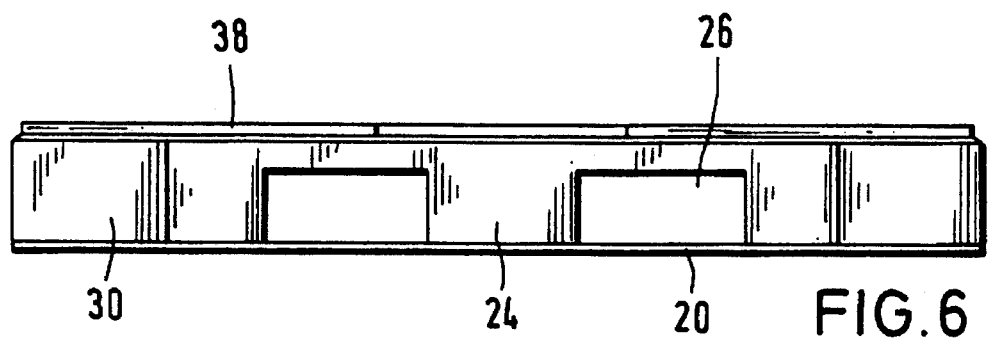
FIG. 6 is a side view of the pallet according to FIG. 5.

The side view of FIG. 6 clearly illustrates the enlarged bevel 30 at the corner areas in the vertical plane.

Figure 7:
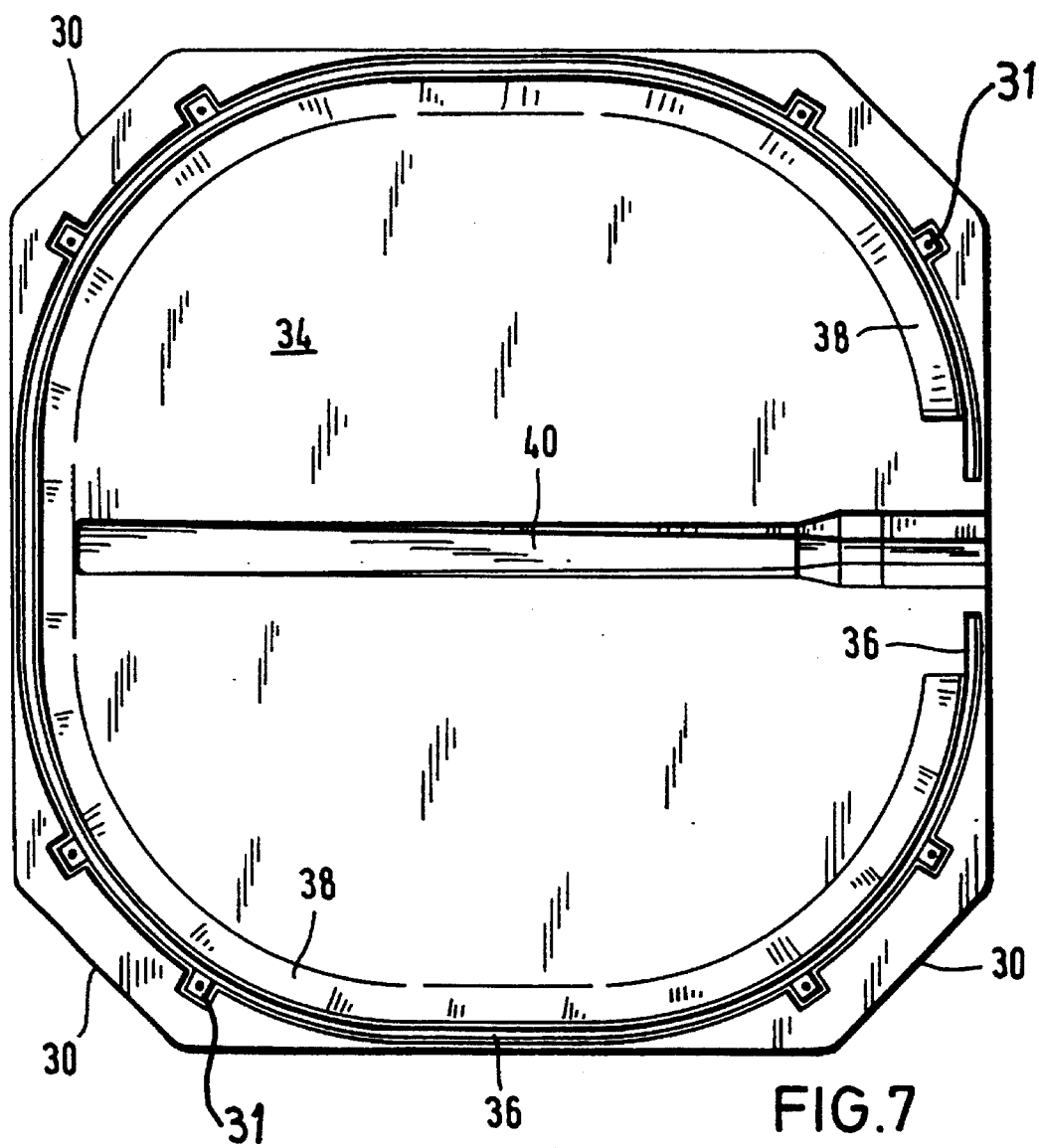
FIG. 7 is a top view of the pallet according to FIG. 5.

The top view of the plastic pallet 32 according to FIG. 7 more clearly illustrates the shape of the molded groove 36, with the supporting ledge 38 adjoining at the inside.

Figure 8:
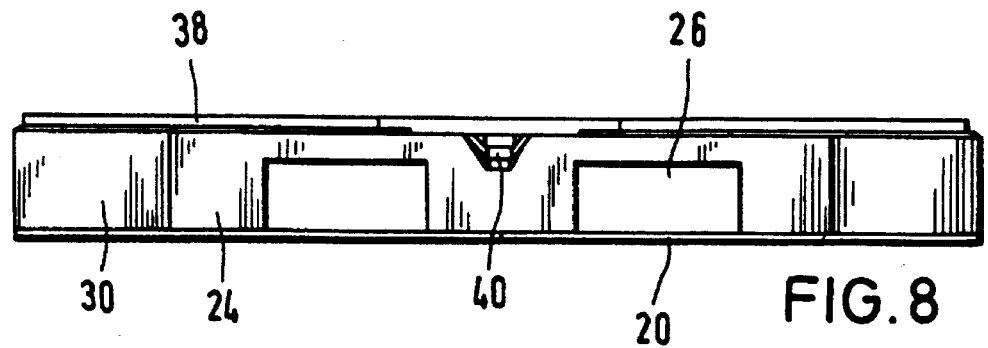
FIG. 8 is a side view of the pallet according to FIG. 5, with a collecting trough formed therein.
Figure 9:
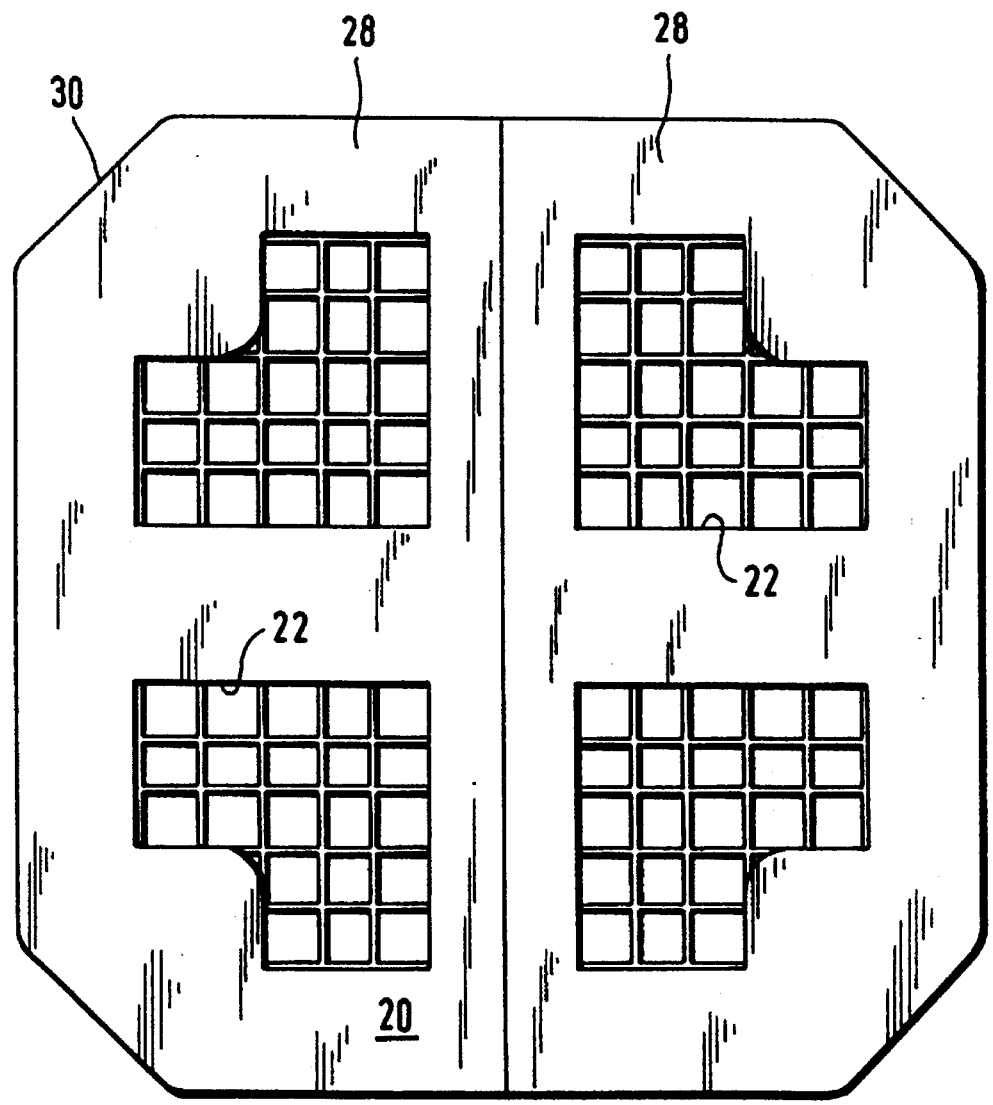
FIG. 9 is a top view of the lower base or base deck of the pallet according to FIG. 5.

FIG. 8 again shows the side view of the plastic pallet 32 with the trough 40 opening at the front. FIG. 9, which is a view of the pallet 32 from the bottom, also shows that the base deck 20 is made of from two identical parts 28, which for manufacturing reasons is advantageous. Certainly, the base deck could also be made as a single piece plate.

Figure 10:
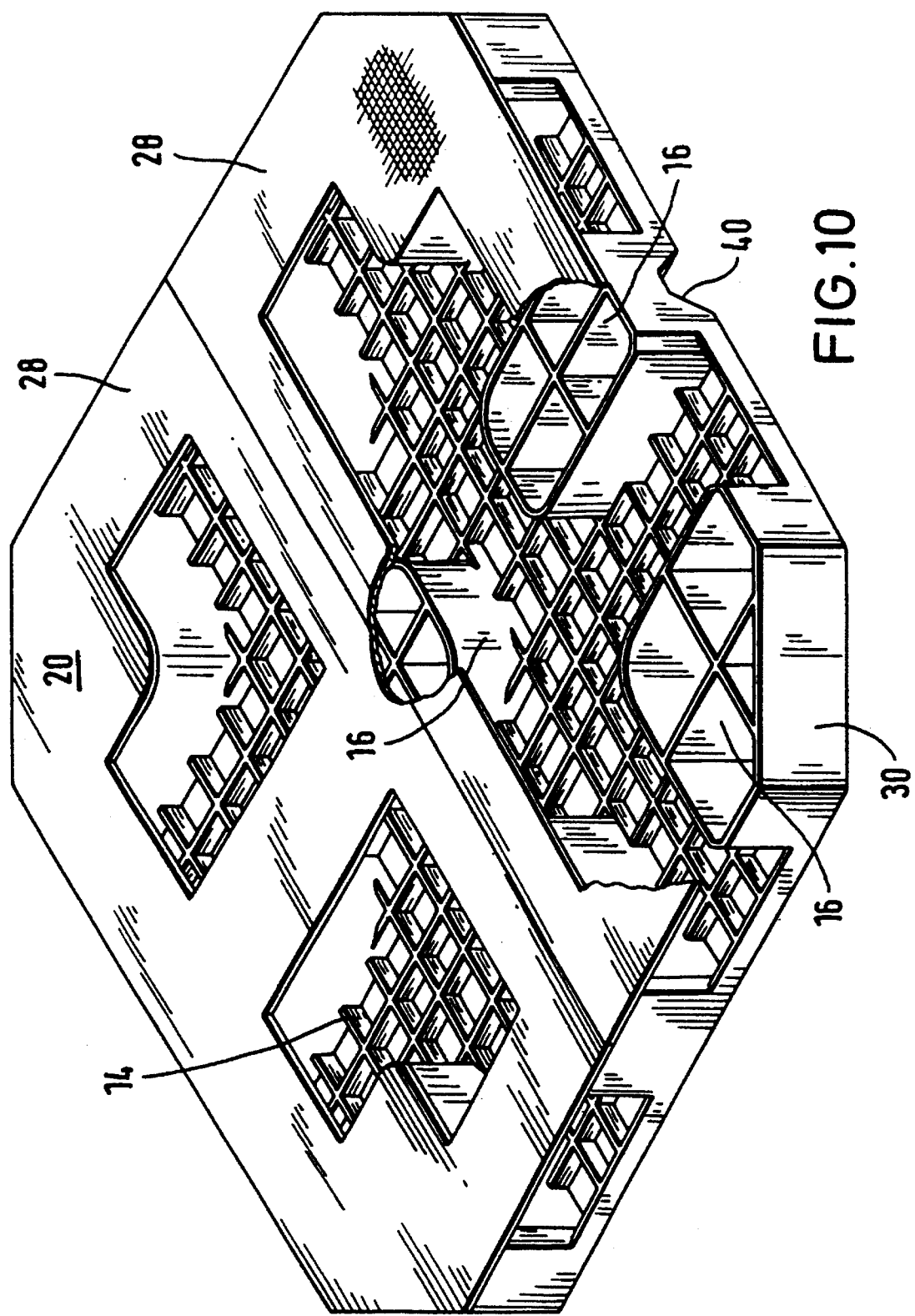
FIG. 10 is a perspective view of the underside of the pallet according to FIG. 5, with the base deck being partially broken away (cut) in the front area.

FIG. 10 shows again a perspective view of the pallet 32 onto the base side, with a portion of the base deck 28 being broken away to better show the ribs 14. In this manner, also the spacers 16 in the center, in the corner regions, and at the outer edges of the pallet are clearly depicted. The base deck 20 or the parts 28 of the base plate are massive but yet have a plate thickness between approximately 6 mm and 12 mm, preferably approximately 8 mm, with the base deck 20 being made from the same material (plastic material) as the upper deck. To increase the material strength and the modulus of elasticity, the base deck can also be additionally provided with suitable fillers, e.g. incorporated fiber material, woven matting, wire inserts or the like as tie rods or stays.

Figure 11:
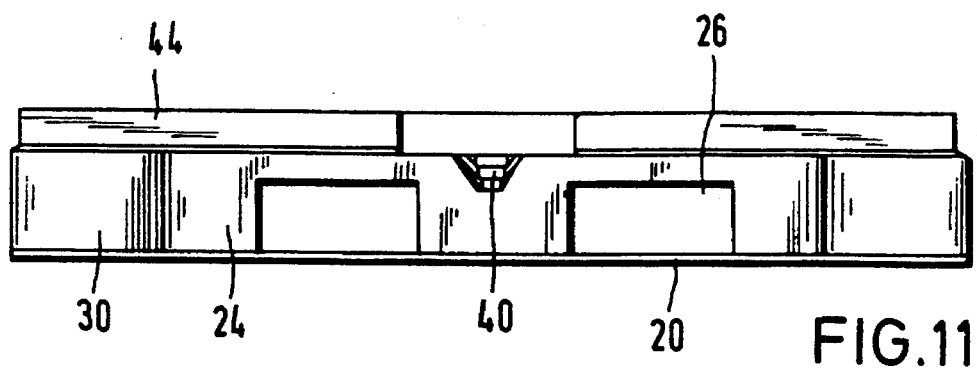
FIG. 11 is a side view of another exemplified embodiment of the plastic pallet, according to the invention, with raised supporting shoulder for a pallet container.
Figure 12:
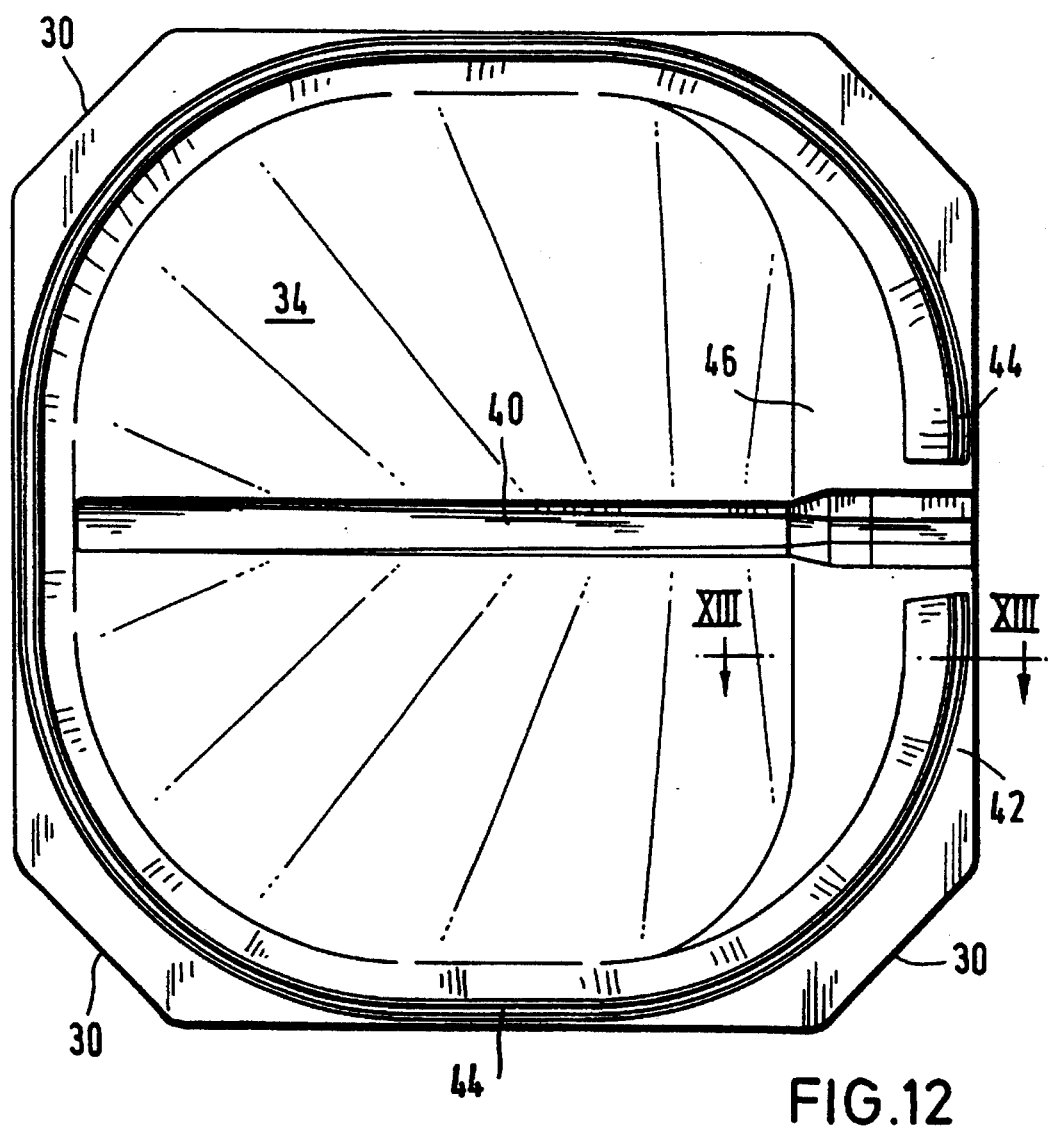
FIG. 12 is a top view of the pallet according to FIG. 11.

A further advantageous embodiment of the plastic pallet is shown in a side view in FIG. 11 and in a top view in FIG. 12. This particular pallet configuration is likewise provided as a base pallet or base frame for a pallet container having an inner thin-walled plastic container with central upper filling opening and lateral lower outlet valve, an outer supporting shell which tightly encloses the plastic container and is made of e.g. sheet steel, wire-grating mesh, metal pipe frame or the like, and the said base pallet. In the circumferential area of the pallet surface 34 is a supporting shoulder 44 which is raised and projects from the upper surface 34. This supporting shoulder 44 could be e.g. a prefabricated injection molded part in the shape of a partial ring which is fastened (glued, welded and/or screwed on) to the pallet surface. It is preferred however to mold the supporting shoulder 44 in one piece or integrally with the upper deck 12 of the pallet during its manufacture in a cost-effective manner in a same working step. If the filled pallet container falls obliquely on its lateral edge, e.g. from the loading surface of a truck, the supporting shoulder 24 prevents a displacement of the inner plastic container relative to the plastic pallet and circumvents damage to or tearing of the fastening means of the outer supporting shell of the base pallet.

As a result of the pallet design according to the invention other conventional auxiliary means such as under-shells or inserted damping mats with a raised edge area or parts of foamed polysterene, etc. can be omitted.

The circumferentially extending supporting shoulder 44 is interrupted only in the area of the opening of the molded trough 40 or at the location of the outlet valve of the inner plastic container. The height of the supporting shoulder 44 is between 30 mm and approximately 120 mm, but preferably between 60 and 80 mm. However, the supporting shoulder 44 could also be provided only in the front half of the pallet around the outlet valve. Another circumferentially extending supporting shoulder could have a different height, e.g. a height of roughly 70 mm in the front half of the pallet and a height of only approximately 30 mm in the rear half of the pallet and the transition can be made continuously.

The dimensions of the plastic pallets for pallet containers are e.g. 1160×1160 mm for a (cubical) oval-round container, although pallet dimensions of 1000×1200 mm can also be used for a 1000 l rectangular container. The outlet valve and opening area of the trough 40 can then be located on a narrower side of the pallet.

As can further be seen from FIG. 12, the closed (i.e. uninterrupted) surface 34 of the plastic pallet is provided on the side of the pallet where the outlet valve is located or parallel thereto with a surface area 46 which is raised relative to the supporting shoulder 44. Further, the surface 34 of the pallet has a slight downward inclination along the surface toward the center of the trough 40, i.e. is provided with a slight downward gradient, to improve the emptying of remainders from the inner plastic container by adapting to its corresponding base configuration. The height of the gradient from the lateral supporting shoulder 44 to the center of the trough 40 is approximately 8 to 12 mm.

The plastic pallet of FIG. 12, a plurality of bores, e.g. eight bores, in a similar fashion as indicated in FIG. 7 by reference numeral 31. These bores traverse the pallet at the outer marginal area 42 in front of the supporting shoulder 44, with elongated vertical grating bars of a grating-type supporting shell being guided therethrough and secured to the pallet from below.

Figure 13:
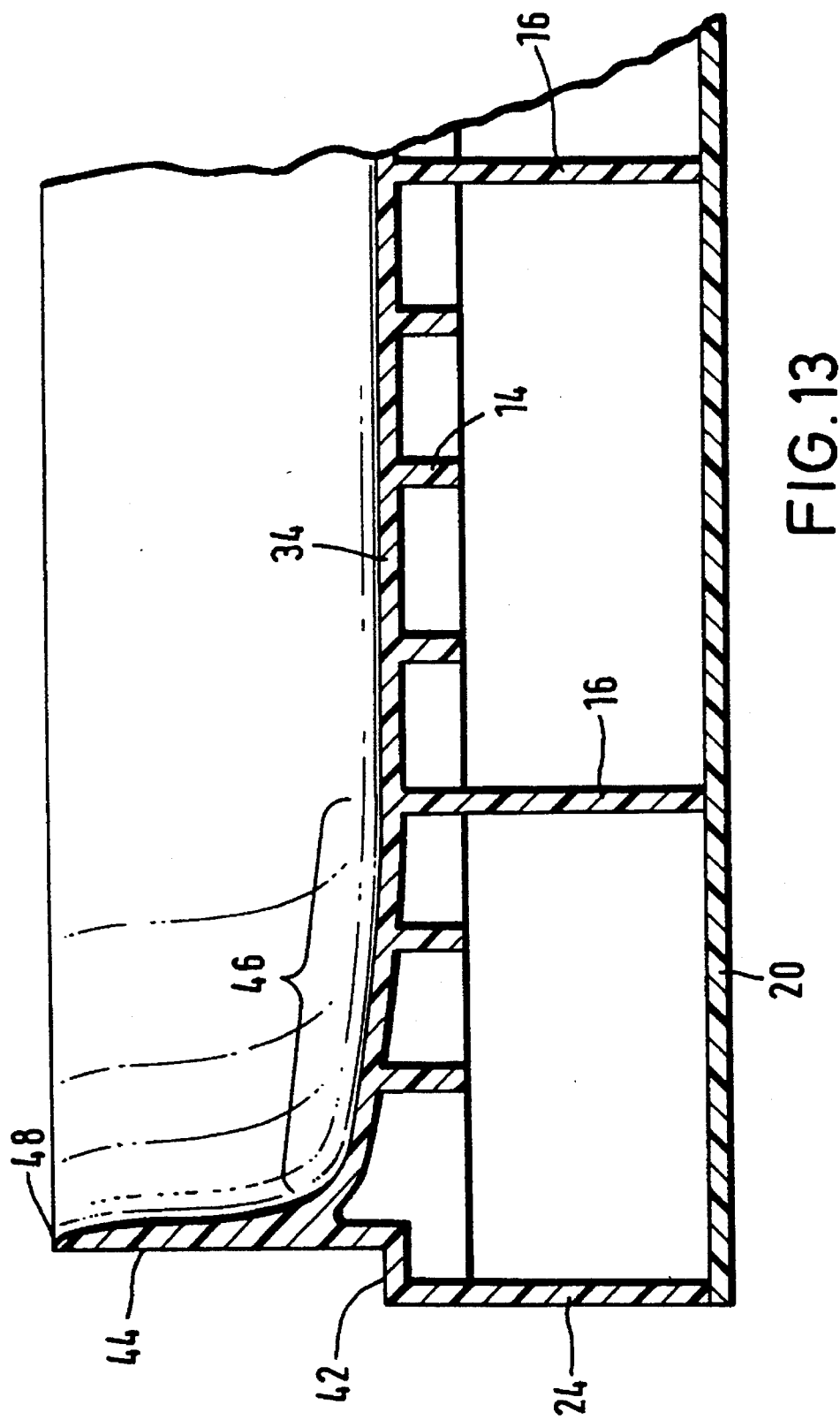
FIG. 13 is an enlarged cross-sectional view of the marginal area of the pallet according to FIG. 11.

FIG. 13 shows an enlarged view, taken along the section line XIII—XIII in FIG. 12, of the marginal area, with the supporting shoulder 44 being raised in one piece from the upper deck of the pallet. In this manner, the configuration of the raised surface region 46 from the upper surface 34 of the pallet can be seen more clearly. The supporting shoulder 44 has a slanted upper edge 48 to adapt to the inserted plastic container. The planar marginal area 42 in which the aforementioned bores are provided for receiving the elongated vertical grating bars is shown on the outside in front of the supporting shoulder 44. However, the groove 36 described in claim 8 for receiving the lower edge of the reinforcing shell of the pallet container could also be additionally molded into the marginal area 42.

Finally, the plastic pallet 10 or 32 according to the invention is suitably made entirely of regenerated recycled plastic (e.g. recycled PE). Such a pallet weighs approximately 25 kg and is preferably colored black. This affords a good opportunity to assign a new use for recovered canister or drum material (e.g. high molecular weight low-pressure PE) which can no longer be utilized to make new containers because of impurities. The features described above are applicable in any combination for all pallet designs.

| LIST OF REFERENCE NUMBERS | |
|---|---|
| 10 | pallet |
| 12 | upper plate |
| 14 | ribs (12) |
| 16 | spacers (12) |
| 18 | base part |
| 20 | base plate |
| 22 | relief (20) |
| 24 | side wall (12) |
| 26 | recess (24) |
| 28 | parts (20) |
| 30 | bevel (10) |
| 32 | pallet for pallet container |
| 34 | surface (32) |
| 36 | groove (34) |
| 38 | ledge (34) |
| 40 | trough (34) |
| 42 | marginal area/outer step |
| 44 | supporting shoulder |
| 46 | raised surface area (34) |
| 48 | slanted upper edge (44) |

We claim:

1. A plastic pallet for storing and transporting goods, comprising:

an upper deck (12) having a substantially planar, closed surface (34) and an underside provided with ribs (14);

spacers (16) aligned at a right angle to and joined to said upper deck (12); and a base deck (20) securely connected to said upper deck (12) via said spacers (16), with openings (26) being formed between said upper deck (12) and said base deck (20) for allowing engagement of forks of a fork lifter for transport capability, wherein the planar surface (34) of said upper deck (12) is provided with an upwardly projecting circumferential strip (38), said upper deck being provided with a central trough (40) which extends in a straight line with increasing depth toward an outer edge of the pallet.

2. The plastic pallet of claim 1 wherein the strip (38) is of substantially triangular cross section.

3. The plastic pallet of claim 1 wherein the planar surface (34) of said upper deck (12) has a circumferential groove (36) for receiving a lower edge of an outer supporting shell of a pallet container.

4. The plastic pallet of claim 3 wherein said strip (38) is provided on the inside of said groove (36).

5. The plastic pallet of claim 1 wherein said base deck (20) is provided with openings (22) for allowing passage of rollers of a lifting truck.

6. The plastic pallet of claim 1, further comprising a continuous side wall (24) for joining together said upper deck (12) and said base deck (20), said side wall (24) having two separate recesses (26) for allowing engagement by forks of a fork lifter or lifting truck.

7. The plastic pallet of claim 6 wherein said base deck (20) is made of two parts (28), said parts (28) as well as said upper deck (12) with said ribs (14), said spacers (16) and said side walls (24) being made by way of compression molding.

8. The plastic pallet of claim 7 wherein said two parts (28) of said base deck (20) are securely welded with said upper deck (12) via said spacers (16) and said side walls (24).

9. The plastic pallet of claim 8 wherein said two parts (28) of said base deck (20) are securely welded with said upper deck (12) via said spacers (16) and said side walls (24 by way of a butt-welding process.

10. The plastic pallet of claim 1 having corners which are beveled at an angle of approximately 45°, with a bevel (30) extending in the vertical plane.

11. The plastic pallet of claim 1 wherein said base deck and said upper deck are made entirely from regenerated recycled plastic material (recycled plastic).

12. The plastic pallet of claim 1 wherein said base deck (20) is massive and has a deck thickness between roughly 6 mm and 12 mm.

13. The plastic pallet of claim 12 wherein said base deck has a thickness of approximately 8 mm.

14. The plastic pallet of claim 1 wherein said base deck (20) is made of a same material (plastic material) as said upper deck (12), but is provided in addition with suitable filler material or fiber material for increasing the material strength and modulus of elasticity.

15. The plastic pallet of claim 1 wherein said substantially planar and closed surface (34) of said upper deck includes in vicinity of its outer edge a peripheral raised supporting shoulder (44) which extends at least partially about the circumference for contact and support of an installed plastic container of the pallet container.

16. The plastic pallet of claim 1 wherein said substantially planar surface (34) of said upper deck (12) has a slight slope and is slightly inclined downwardly toward the central trough (40).

* * * * *